United States Patent
Acampora

(10) Patent No.: US 9,622,489 B2
(45) Date of Patent: Apr. 18, 2017

(54) DEVICE TO MOLD AND COOK A FOOD PRODUCT, METHOD TO OBTAIN SAID FOOD PRODUCT AND FOOD PRODUCT THUS OBTAINED

(71) Applicant: INNOVATION ALPS S.A., Granges-Paccot (CH)

(72) Inventor: Gerardo Acampora, Cormons (IT)

(73) Assignee: INNOVATION ALPS S.A., Granges-Paccot (CH)

( * ) Notice: Subject to any disclaimer, the term of this patent is extended or adjusted under 35 U.S.C. 154(b) by 111 days.

(21) Appl. No.: 14/349,547

(22) PCT Filed: Oct. 5, 2012

(86) PCT No.: PCT/IB2012/001978
§ 371 (c)(1),
(2) Date: Apr. 3, 2014

(87) PCT Pub. No.: WO2013/050866
PCT Pub. Date: Apr. 11, 2013

(65) Prior Publication Data
US 2014/0272022 A1    Sep. 18, 2014

(30) Foreign Application Priority Data
Oct. 7, 2011  (IT) .............................. UD2011A0159

(51) Int. Cl.
*A21B 3/13* (2006.01)
*A21C 9/04* (2006.01)
(Continued)

(52) U.S. Cl.
CPC .............. *A21B 3/134* (2013.01); *A21B 3/132* (2013.01); *A21B 3/139* (2013.01); *A21C 9/045* (2013.01);
(Continued)

(58) Field of Classification Search
CPC ..... A47J 37/0694; A47J 43/18; A47J 37/1295
(Continued)

(56) References Cited

U.S. PATENT DOCUMENTS 1,596,331 A     8/1926  Bassett
1,596,652 A *  8/1926  Giovannetti ........ A47J 37/1295
                                                            249/171
(Continued)

FOREIGN PATENT DOCUMENTS

EP        1639896      3/2006
GB         372566      5/1932

*Primary Examiner* — Tu B Hoang
*Assistant Examiner* — Thomas Ward
(74) *Attorney, Agent, or Firm* — Hamre, Schumann, Mueller & Larson, P.C.

(57) ABSTRACT

A device to mold and cook a food product (50) comprises at least a mold (12) and at least a molding member (16). The mold has a cavity (14) in which to place on each occasion at least the uncooked dough. The cavity (14) is delimited externally by an external perimeter edge (18). The molding member (16) is shaped with a closed profile, has a shape and size mating with those of the external perimeter edge (18), and has a position distanced from the mold (12) and a position coupled with the mold (12) in order to shape and mold the product (50) into the desired final shape.

12 Claims, 6 Drawing Sheets

(51) Int. Cl.
*A21C 9/08* (2006.01)
*A21D 8/06* (2006.01)
*A23P 10/10* (2016.01)
*A23P 20/20* (2016.01)

(52) U.S. Cl.
CPC ............... *A21C 9/081* (2013.01); *A21D 8/06* (2013.01); *A23P 10/10* (2016.08); *A23P 20/20* (2016.08)

(58) Field of Classification Search
USPC ..... 219/324, 450; 99/352, 357, 348; 426/19, 426/496, 497
See application file for complete search history.

(56) References Cited

U.S. PATENT DOCUMENTS

| | | | | |
|---|---|---|---|---|
| 2,026,829 A * | 1/1936 | Ellinger | ................... | A21B 3/13 126/385.1 |
| 2,212,003 A * | 8/1940 | Basham | ............... | A47J 37/0611 426/134 |
| 3,656,968 A | 4/1972 | Allen | | |
| 4,938,975 A | 7/1990 | Waller | | |
| 4,966,781 A | 10/1990 | Artzer | | |
| 2005/0039737 A1* | 2/2005 | Haber | ................... | A47J 37/0611 126/30 |

\* cited by examiner

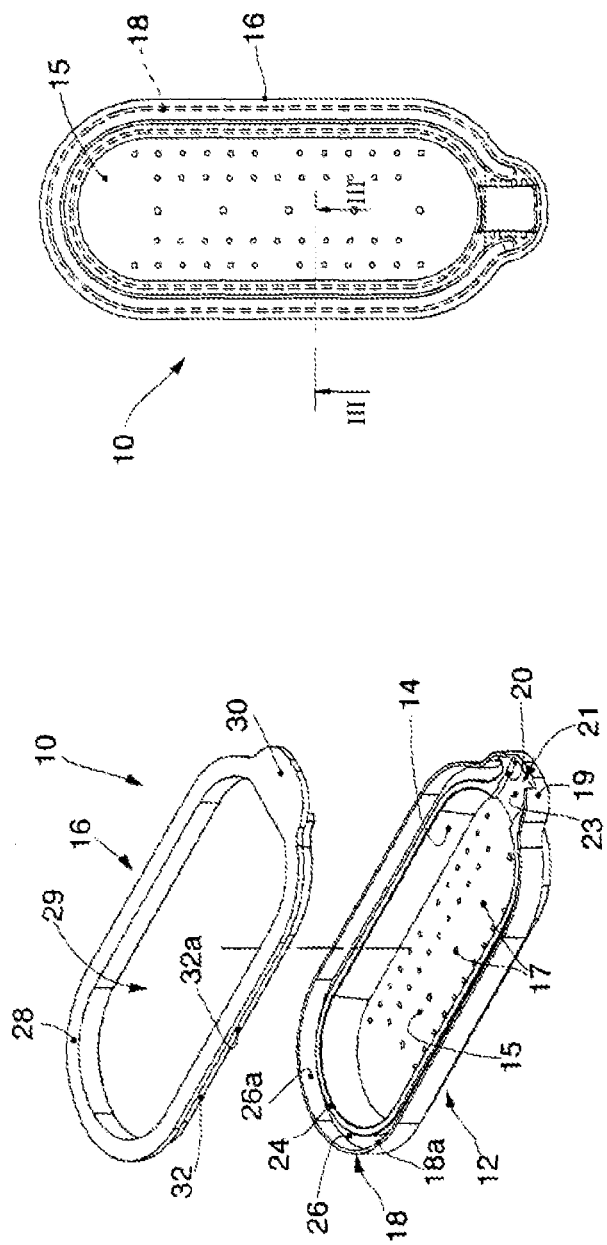
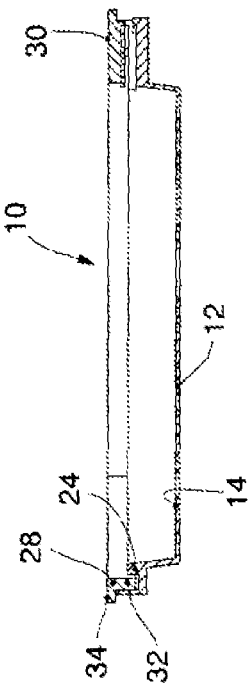
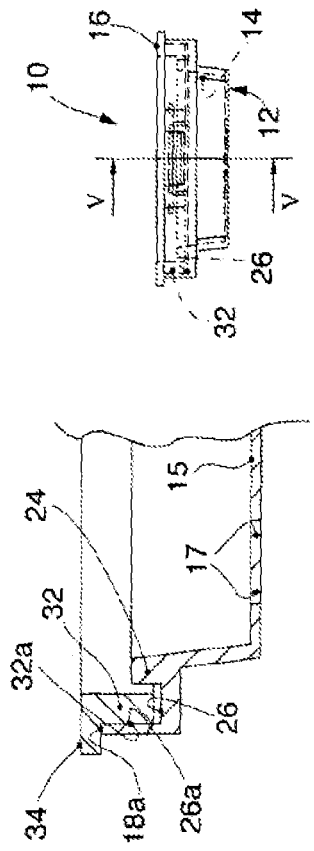

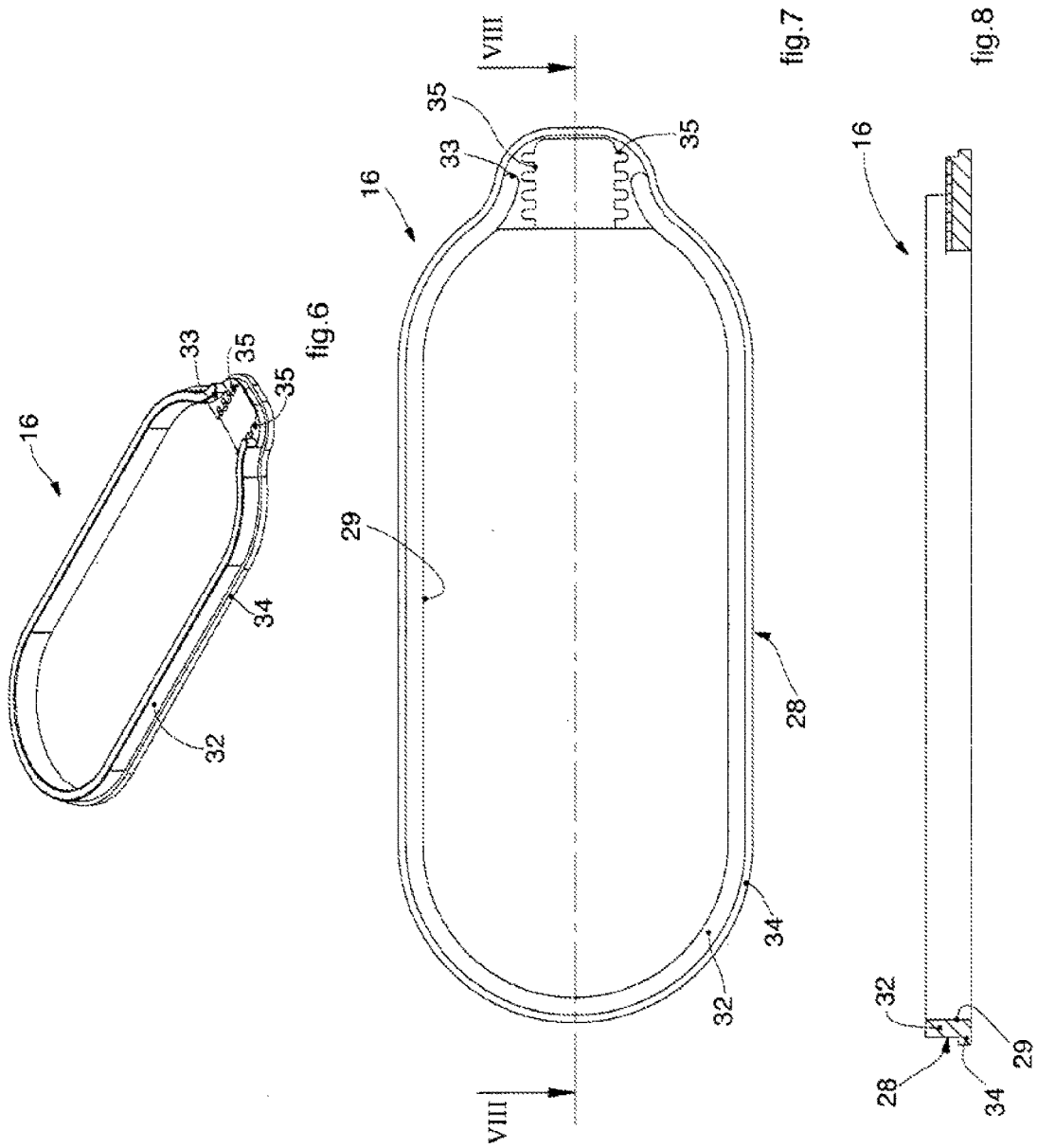

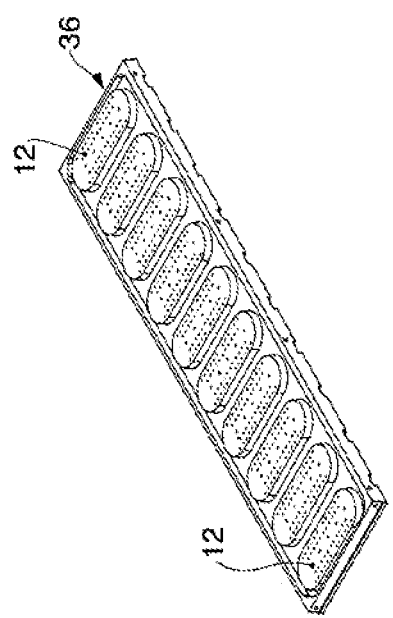
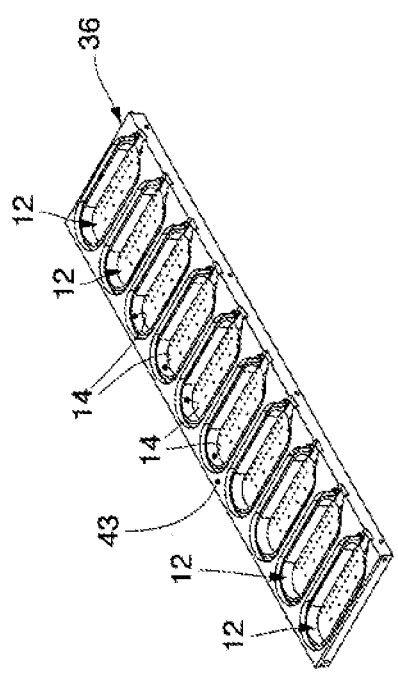
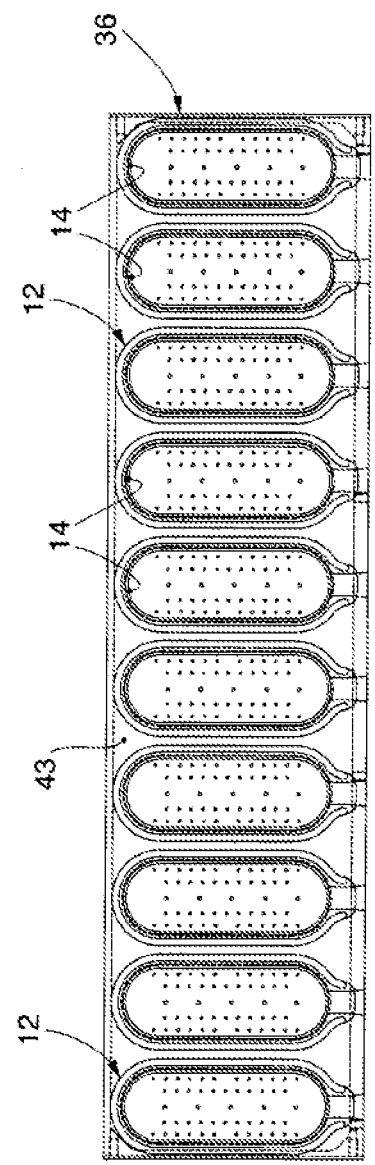

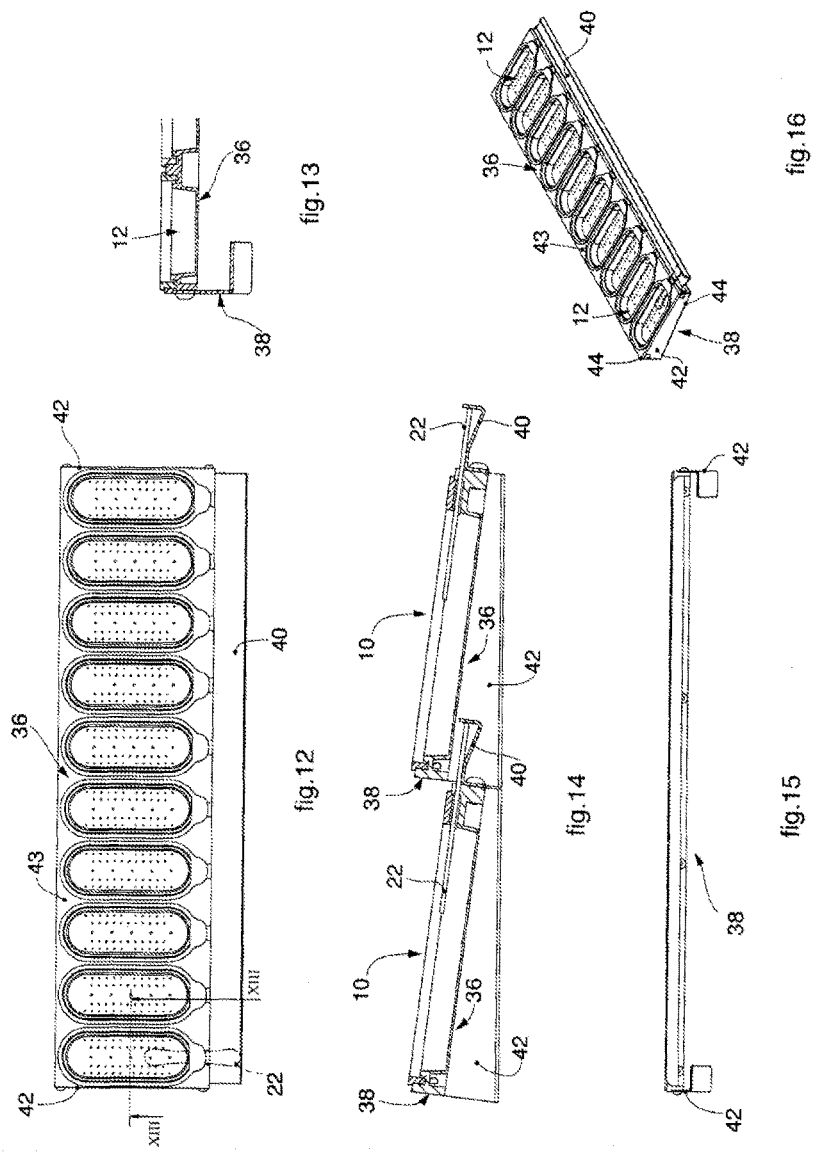

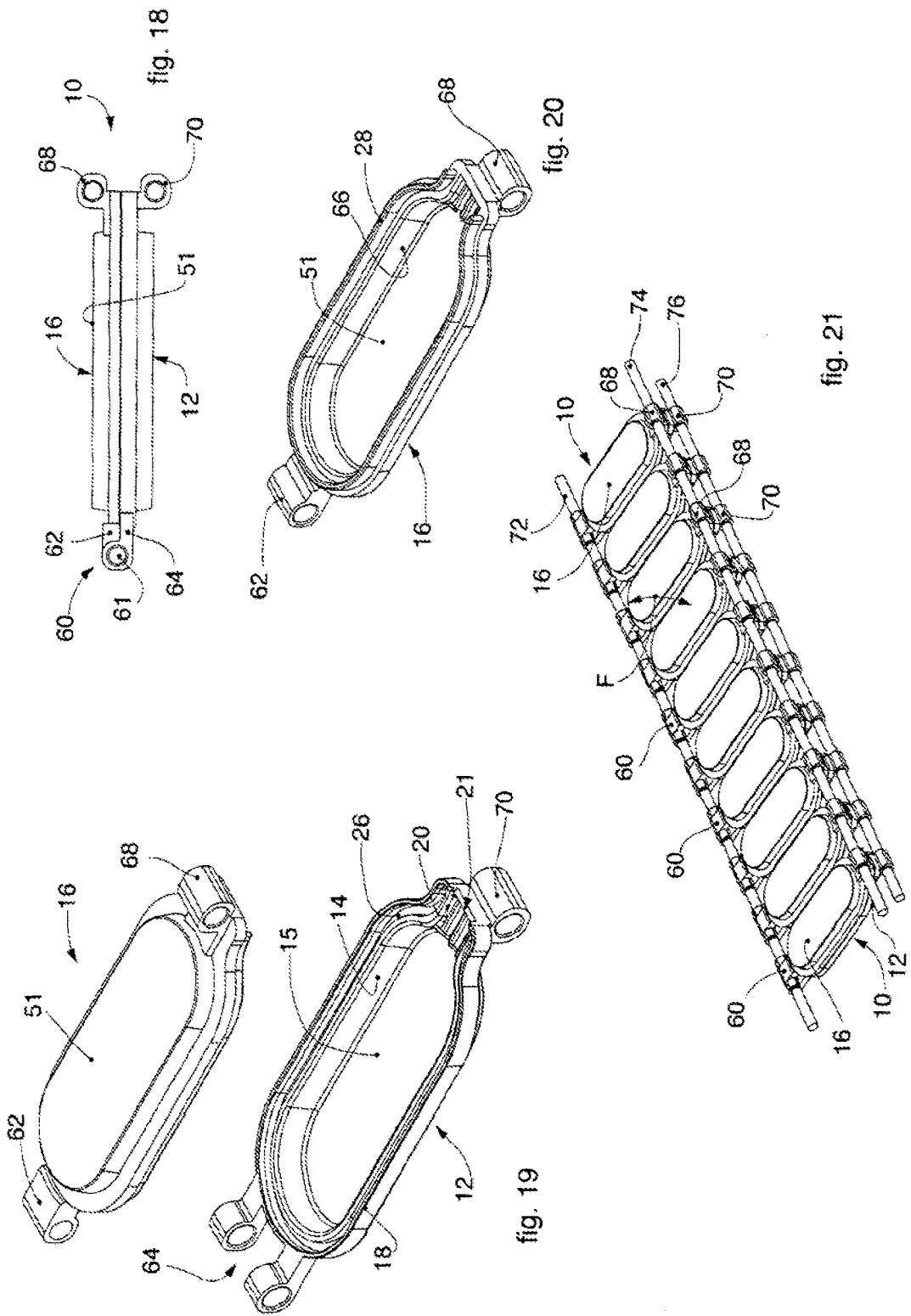

DEVICE TO MOLD AND COOK A FOOD PRODUCT, METHOD TO OBTAIN SAID FOOD PRODUCT AND FOOD PRODUCT THUS OBTAINED

FIELD OF THE INVENTION

The present invention concerns a device to mold and cook a food product, a method to obtain said food product and the food product thus obtained.

In particular, the food product obtainable with the present invention is the type supported by a supporting stick, and can therefore be eaten as a food product on the move.

The present invention can be applied for example to baked food products or to fried food products.

The present invention can be applied for example to filled food products, or to food products that are filled after cooking.

The present invention can be applied for example to food products formed by a bread dough or a pizza dough, or similar or comparable mixtures, or formed by a different dough, such as for example flaky pastry.

The present invention can be applied for example to filled food products or which are filled with savory fillings, or sweet fillings.

In particular, without limiting the field of application of the present invention, the food product in question can be for example a filled baked food product, such as a filled pizza, without however excluding variants such as focaccia or suchlike or similar filled food products.

BACKGROUND OF THE INVENTION

It is known to make filled pizza, providing to roll out the pizza dough, put the filling on top, which may or may not be based on mozzarella and/or tomato, to fold the dough over on itself with the lateral edges overlapping, and closing the filling inside the compartment that is thus formed; after this, the whole thing, possibly on a baking tray, is baked in the oven.

Pizzas made in this way, given their sizes, are normally eaten at the table, or are 3 0 made smaller so that they can be eaten on the move. However, products like this, when they are just taken out of the oven or reheated, are very hot, which makes it inconvenient to hold them in the hand without getting burnt, unless napkins, plates or other auxiliary supports are used.

Documents U.S. Pat. No. 3,656,968, U.S. Pat. No. 4,966,781, U.S. Pat. No. 4,938,975, GB-A-372,566 and U.S. Pat. No. 2,026,829 describe known methods and devices for the production of different food products.

Purpose of the present invention is to obtain a food product, for example a filled baked food product, such as pizza, without however excluding variants such as focaccia or suchlike or similar food products, which can be produced simply and reliably, and which is easy to transport and used as a food product on the move.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose a device to mold and cook a food product comprises at least a mold that has a cavity delimited externally by an external perimeter edge and in which the uncooked dough is put, and at least a molding member.

The molding member is shaped with a closed profile, having shape and size mating with those of the external perimeter edge of the cavity of the mold, and has a position distanced from the mold and a position coupled with the mold in order to cooperate with the portions and strips of dough that exceed the sizes of the mold, so as to shape and mold the product.

In some embodiments of the present invention, the mold has a rib inside, distanced from the external perimeter edge by a desired length. The rib is mating in shape with the external perimeter edge, thus defining a seating that partly surrounds the cavity, with which the molding member is coupled. The molding member also comprises a peripheral frame which develops in a closed profile, to affect the whole external perimeter edge, and a ridge that protrudes from the peripheral frame, mating in shape with the seating of the mold.

In this way, it is possible to obtain a food product in a few, easy operations that are reliably repeatable industrially; the food product may be for example a filled oven product, such as filled pizza or suchlike, which can also be used as a food product on-the-move.

In one embodiment, the molding member is at least a welding member both to define the shape and also to weld the dough and make it solid along the edges of the finished food product.

In one embodiment, the molding member is also a cutting member, to cut and eliminate the portions and strips of dough that exceed the sizes of the mold so as to shape and mold the food product in the desired final shape. Advantageously, the excess portions removed constitute offcuts which can be reused in the dough of the food product.

In another embodiment, the molding member is a welding and cutting member.

In one embodiment, the external perimeter edge has an open profile and has a seating for positioning a supporting stick which is disposed transverse to the external perimeter edge to be partly incorporated into the product. In one embodiment, the development of the peripheral frame affects the whole external perimeter edge, including the segment where the seating is made.

In one embodiment, the molding member is open and is formed by said peripheral frame.

In one embodiment, the molding member is closed, configured as a cover formed by a central plate that has said peripheral frame on its perimeter.

In one embodiment, the central plate and the peripheral frame define an expansion seating.

According to one embodiment of the present invention, the molding member and the mold are reciprocally sized so as to be tangentially coupled flush, or also slightly inclined one with respect to the other, thus determining the cutting action on the dough exceeding the mold. In particular, when the molding member is coupled with the mold, the ridge that protrudes from the peripheral frame of the molding member is inserted into the seating of the mold flush, or also slightly inclined, or with a play tolerance, with the innermost peripheral side of the external perimeter edge of the mold.

According to a variant of the present invention, the ridge is sized with a height slightly less than the depth of the seating of the mold, so that when the molding member is coupled with the mold, the lower face of the ridge remains slightly distanced from the bottom of the seating, defining a free space.

According to one embodiment, the mold is hinged to the molding member.

According to one embodiment, the device according to the present invention comprises a plurality of molds, that is, it is the multi-mold type.

In a variant, the molds are all hinged to the respective molding members by means of a single pin or bar.

In a variant, the molds are integrated in a single tray.

According to a variant embodiment, the device according to the present invention comprises an inclined or horizontal support frame which positions the tray with the molds.

In some variants, the support frame is hollow inside and has a front blade, inclined or horizontal, for positioning the sticks to be associated to each of the molds, and able to be inserted at least partly inside an adjacent tray disposed sequentially during cooking.

In a variant, the support frame comprises two lateral walls with inclined or horizontal sides, between which a surface develops on which said molds are made and which defines an inclined or horizontal plane, parallel to which the molds lie, said lateral walls being connected by one or more transverse elements associated with the front blade.

The present invention also concerns a method for preparing a food product using a device as described above, which provides to put a layer of uncooked dough on the cavity of the mold, to position the stick so that it partly protrudes inside the cavity and partly outside the mold, to deposit another layer of uncooked dough overlapping the layer of dough already deposited, to cover everything, for example even if the filling is inserted before cooking, to cut, possibly before cooking, the portions or strips of dough that exceed the bulk of the mold, then to carry out the cooking of the dough contained in the mold and keep the stick in the food product after cooking.

According to the present invention, by cooking we mean both baking in the oven and also frying, in boiling oil or fat, and also other known types of cooking, similar, comparable or equivalent.

According to a variant, the cooking is done in the oven, inserting the device in the single mold or multi-mold version, or part of the device containing the dough, into the oven.

In another variant the cooking is done by frying the dough, for example immersing the device according to the present invention in the single mold or multi-mold version for a desired period of time, with the dough contained in it, or part of the device containing the dough, in a suitable food oil boiling at the appropriate temperature to fry the dough of the food product.

The present invention also concerns a food product which comprises a closed shell or casing of cooked dough. The closed shell or casing comprises a line of closing deriving from the joining of at least two overlapping strips or layers of dough, and a stick partly inserted into the closed shell or casing, in which the stick remains inserted during cooking and is retained in the closed shell or casing also after cooking.

According to one embodiment, the closed shell or casing has a reinforced portion that surrounds the stick, stabilizing the connection between the stick and the closed shell or casing.

According to a variant, the closed shell or casing has on its periphery a thin strip which surrounds the line of closing and a relative sealing bead with a larger section than the thin strip, which can possibly be removed, or not.

In some embodiments, the food product according to the present invention is a product, for example baked or fried, which can be prepared empty and later filled, or it can be prepared already filled.

In other variants, the dough of the food product can be bread dough or pizza dough or similar doughs.

For example the food product according to the present invention can be a filled product such as a filled pizza or suchlike, with a closed shell or casing made of cooked pizza dough or suchlike or comparable, inside which there is a filling.

In other variants, the dough of the food product can be flaky pastry.

BRIEF DESCRIPTION OF THE DRAWINGS

These and other characteristics of the present invention will become apparent from the following description of some embodiments, given as a non-restrictive example with reference to the attached drawings wherein:

FIG. 1 is a perspective view from above of separate parts of one embodiment of the device according to the present invention;

FIG. 2 is a plan view from above of a part of the device in FIG. 1;

FIG. 3 is a section from III to III of FIG. 2;

FIG. 4 is a front view of FIG. 2;

FIG. 5 is a section from V to V of FIG. 4;

FIG. 6 is a perspective view of another part of the device in FIG. 1;

FIG. 7 is a plan view from above of FIG. 6;

FIG. 8 is a section from VIII to VIII of FIG. 7;

FIG. 9 is a perspective view from above of another embodiment of the device according to the present invention;

FIG. 10 is a perspective view from below of FIG. 9;

FIG. 11 is a plan view from above of FIG. 9;

FIG. 12 is a plan view from above of a variant of the embodiment in FIG. 9;

FIG. 13 is a section from XIII to XIII of FIG. 12;

FIG. 14 is a cross section of FIG. 12;

FIG. 15 is a front view of FIG. 12;

FIG. 16 is a perspective view from above of FIG. 12;

FIG. 18 shows a side view of a variant of the device according to the present invention;

FIG. 19 shows two separate parts of the variant in FIG. 18;

FIG. 20 shows another view of a part of FIG. 19;

FIG. 21 shows another variant of the device according to the present invention.

DETAILED DESCRIPTION OF SOME FORMS OF EMBODIMENT

Figure 17:
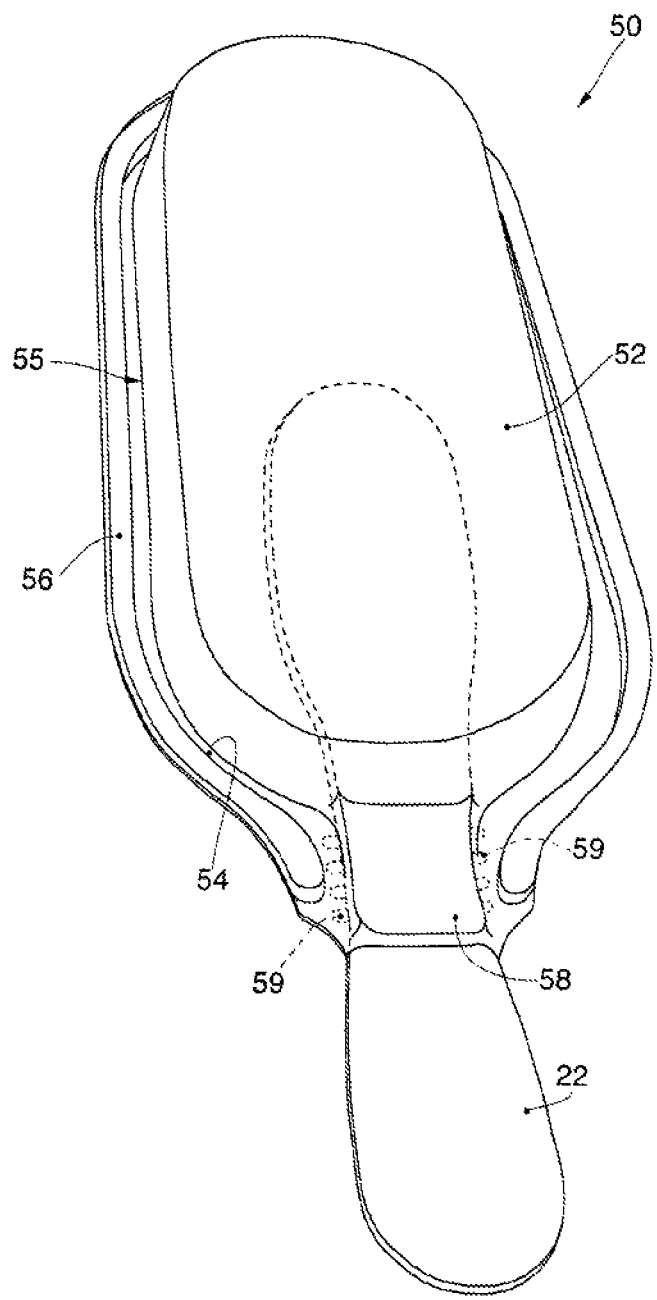
FIG. 17 is a perspective view from above of a food product obtainable according to the present invention.

With reference to the attached drawings, a device 10 is shown used for molding and cooking a food product 50. In this case, reference is made, but without limiting the field of protection of the present invention, to a filled baked food product, such as a filled pizza or suchlike, as shown for example in FIG. 17.

The product 50 is formed by a closed shell or casing 52 of dough, for example cooked pizza dough, or suchlike or comparable, inside which there can be a filling.

The closed shell or casing 52 of dough comprises a line of closing 55 deriving from the joining of at least two overlapping strips or layers of dough.

The filling can be sweet or savory, and may also be inserted into the closed shell or casing 52 before or after cooking For example, the filling may be based on cheese products, or dairy products, for example melted cheese or mozzarella, vegetables, generally but not exclusively tomato, salami, spices and other ingredients, such as meat or other, normally used in the food products in question.

The closed shell or casing 52 has a thickness commensurate with the filling to be contained, and can have an ovoid or elliptical plan shape. However, other geometric shapes cannot be excluded: regular, circular or polygonal, star-shaped or other irregular or imaginative shapes.

In some embodiments, the closed shell or casing 52 can have on its periphery a thin closing strip 54 that surrounds the line of closing 55.

In some embodiments, the closed shell or casing 52 can also have a sealing bead 56 of dough, with a larger section than the thin strip 54.

The product 50 also comprises a stick 22 or similar or comparable support element, partly inserted inside the closed shell or casing 52 and partly protruding from it, so that the user can easily grip it. Generally, the stick 22 is "propeller" shaped, that is, a flat element, shaped with two lateral lobes and a central connection portion with a double cavity (FIG. 17).

The stick 22 can be made of a material suitable to support the typical cooking temperatures and times of oven-baked products, generally between about 150° C. and about 450° C., usually between about 2 minutes and 15 minutes. The material can be a polymer, for example with a PET base, such as C-PET, or wood, possibly coated or treated with a material that makes it resistant to cooking conditions. Otherwise, the stick 22 can be made of material resistant to frying conditions.

In some embodiments, the stick 22 is stably associated with the closed shell or casing 52 by means of a reinforced portion of dough 58 which, once cooked, defines an increased thickness which strengthens the connection zone with the stick 22.

The device 10 (FIGS. 1-8) comprises at least a mold 12 which has a cavity 14 into which the uncooked dough is positioned on each occasion. The uncooked dough is suitably laid or distributed, making it adhere properly to the walls of the cavity 14. Then the filling is put in.

In this case, the mold 12 in some variants has through holes 17 (FIG. 1), both to prevent the formation of air bubbles when the layer of uncooked dough is deposited or distributed on the bottom of the cavity 14, allowing to make the dough adhere uniformly to the walls and bottom 15 of the cavity 14, and also, possibly, to promote the exit of gas and steam that form during cooking. The through holes 17 are sized so as to perform their function but without having a negative influence on the structure of the dough, thus preventing the dough from dripping through them or creating unwanted loops in them.

The cavity 14 of the mold 12 is shaped in correlation to the desired final shape of the product 50, to determine the molding of the dough which will then be consolidated after cooking. The cavity 14 has a bottom 15 that, in this case, is provided with the through holes 17.

The cavity 14 is delimited externally by an external perimeter edge 18, formed by a wall that surrounds said cavity 14 and defining an upper face 18a which during use faces toward the molding member 16.

In particular, the uncooked dough is generally placed covering the whole mold 12, so that the peripheral strips rise above the external perimeter edge 18 of the mold 12. Subsequently, in some embodiments, the filling can be distributed on the dough thus deposited.

Furthermore, in some embodiments, the stick 22 can be positioned so that it extends partly inside the cavity 14 and partly outside the mold 12 and then another layer of uncooked dough is deposited, either folding back on itself the dough previously deposited in the mold 12, or by superimposing another portion of uncooked dough, laid or deposited in some way, to cover everything.

Furthermore, in some embodiments the external perimeter edge 18 has an open profile, and in some variant embodiments it may have a seating 20 that is lowered with respect to the upper end of the external perimeter edge 18, which thus interrupts in a desired position the external perimeter edge 18 itself, and in which the stick 22 is positioned transversely.

The seating 20 (FIG. 1) in this case has a front window 21 which is open both at the top and at the side, toward the inside and outside of the mold 12, to position the stick 22, and a bottom 23 to rest the latter. The external perimeter edge 18, in correspondence to the seating 20, has a protruding wider portion 19, suitable to define the bottom 23 of the seating 20 so as to allow a stable support for the stick 22. The "propeller" conformation of the stick 22 as described above is advantageous since, once the stick 22 has been positioned from above with its narrow central portion resting on the bottom 23, the two lateral lobes of the "propeller" of the stick 22, since they have a wider section, prevent it from coming out of the seating 20.

The device 10 also comprises a molding member 16, by means of which, during preparation, before cooking, possibly also used during cooking, the shape of the product 50 is defined in its entirety, welding the strips of dough and making them solid, so as to close the closed shell or casing 52 of the product 50, obtaining the line of closing 55 with the corresponding thin strip 54 and the possible sealing bead 56.

In some embodiments, the molding member 16 can be configured as a cutting member which, as well as performing the welding as above, allows to cut and eliminate the portions and strips of dough exceeding the sizes of the mold 12, so as to shape and mold the product in the desired final form (FIGS. 6, 7, 8 and 17).

In particular, the molding member 16 is configured to obtain a same-shape coupling with the mold 12, to obtain the desired shaping action, in this case also cutting the excess strips of dough. The molding member 16 can be separated from the mold 12, as in FIGS. 1-6, therefore having a distanced, non-operative position and a position coupled with the mold 12, in order to cut the excess dough. In variant embodiments, the molding member 16 can also be constrained in a mobile manner to the mold 12, for example hinged along one edge, to selectively assume the distanced position and the position coupled to the mold 12.

The molding member 16 is shaped with a closed profile, having mating shape and sizes with those of the external perimeter edge 18 of the mold 12.

In the embodiment shown in FIGS. 1, 6, 7 and 8 the molding member 16 is open, that is, it consists substantially of a peripheral annular welding and cutting profile.

The molding member 16 is formed by a peripheral frame 28 that defines the peripheral annular welding and cutting profile. The peripheral frame 28 develops along a closed path that affects the whole peripheral edge of the molding member 16, delimiting a central aperture 29. In one embodiment, the peripheral frame 28 has a continuous closed profile, that is, without intervals or discontinuity, so as to cause a homogeneous pressure on the dough, to obtain a uniform welding along the edge and in this case a clean cut as well. The peripheral frame 28 is shaped so that, once associated with the mold 12, it affects the whole external perimeter edge 18, also including the segment where the seating 20 is made.

Thanks to the conformation of the molding member 16 according to the present invention, when it is configured for cutting, by coupling it to the mold 12, all the portions and strips of dough exceeding the mold 12 are eliminated at a single stroke, that is, with a single positioning operation and slight pressure of the molding member 16.

The peripheral frame 28 can also include a gripping portion 30.

The mold 12 has a rib 24 (FIGS. 1 and 3) inside and distanced from the external perimeter edge 18 by a desired length, and mating with the external perimeter edge 18. Between the rib 24 and the external perimeter edge 18 a seating 26 is thus delimited, with an open profile, which thus partly surrounds the cavity 14, except for the segment where the seating 20 is made, and with which the molding member 16 is coupled.

In particular, the open profile seating 26 is substantially U-shaped, that is, defined by a first innermost lateral surface of the rib 24, a bottom surface and an outermost lateral surface 26a of the external perimeter edge 18.

In a coordinated manner, the molding member 16 has a ridge 32, mating in shape to the seating 26, also therefore with an open profile, which protrudes from the peripheral frame 28, defining a protruding perimeter fin 34 of the peripheral frame 28. The ridge 32 has a lateral surface 32a (FIG. 3) which during use, when the molding member 16 is coupled with the mold 12, faces the lateral surface 26a of the external perimeter edge 18. The ridge 32, in particular, is interrupted by an aperture 33, mating in shape and size to the seating 20 of the mold, for positioning above the stick 22. The aperture 33 can have segments 35 in a crest or similar, disposed transverse to the positioning axis of the stick 22, to determine other reinforcement ribs 59 of the closed shell or casing 52 (FIG. 17) with a greater thickness in the connection zone of the stick 22 which, developing transverse to the stick 22, increase the resistance to flexion of the dough once cooked.

The molding member 16 and the mold 12 are reciprocally sized to be coupled tangentially flush, or also slightly inclined, with respect to each other, so that, when the ridge 32 is inserted into the seating 26, the lateral surfaces 32a and 26a, respectively external of the ridge 32 and internal of the seating 26, are in contact and can slide with respect to each other, thus determining the action of welding and possibly cutting the dough exceeding the mold 12 (FIG. 3).

Furthermore (FIGS. 3 and 5), the ridge 32 is sized with a slightly lower height than the depth of the seating 26, so that when the molding member 16 is coupled with the mold 12, the protruding perimeter fin 34 abuts against the upper face 18a of the external perimeter edge 18, and consequently the lower face of the ridge 32 remains slightly distanced from the bottom of the seating 26, defining a free space or gap, for example for the dough or other, as can be seen in FIGS. 3 and 5.

Thanks to this configuration, in the case of cutting, once the excess dough has been eliminated from the mold 12, and the food product cooked, in the gap between the lower face of the ridge 32 and the bottom of the seating 26, the thin strip 54 is determined as described above, which surrounds the line of closing 55 of the closed shell or casing 52 of the product 50. The thin closing strip 54 consists of dough compressed by the coordinated action of the ridge 32 with the seating 26.

When cooking is complete, the sealing bead 56 is also formed around the thin strip 54 of compressed dough. This can happen, for example, due to the effect of the rising or proving and development of the mixture during the conventional cooking in the oven of a dough of the type in question. In the final product 50, the sealing bead 56, and possibly the thin strip 54 too, can be retained or removed, for esthetic or packaging purposes, by trimming around the closed shell or casing 52.

Furthermore, providing the possible lowered seating 20, leaving a space free for the cooking dough to develop, determines the formation of the reinforced portion 58 around the stick 22, which constitutes a stiffening base that surrounds the stick 22 and thus strengthens the connection between stick 22 and closed shell or casing 52.

The food product according to the present invention, once it has been molded, is cooked for example in the oven or fried, directly in the mold 12, removing the molding member 16 or possibly keeping it coupled with the mold 12 during the cooking, according to the variants, without removing the product from the mold 12, thus increasing productivity and simplifying the process.

In some embodiments, once cooking is complete, the stick 22 is kept partly inserted in the product 50.

Providing the seating 26, which substantially defines an interspace delimited by the material of the mold, allows to obtain an edge of the closed shell or casing 52 of the product 50 that has good properties of crunchiness, thanks to the fact that a stream of heat is determined that is concentrated along the external perimeter edge 18 of the mold 12.

In order to obtain an effective thermal transmission during cooking, the mold 12 is advantageously made of metal with heat conductivity capacity and compatible for use with food, preferably aluminum. However, the use of other metals cannot be excluded, provided they have good heat conductivity and are suitable for use with food, nor the use of non-metal materials, for example polymers, such as silicon molds or other. In some embodiments the material selected for the mold 12, and possibly for the molding member 16, is resistant to the baking conditions or frying conditions, according to the variants.

Once cooked, the product 50 can be eaten immediately, packaged and sold as a fresh product, or it can be cooled and frozen for subsequent consumption, generally after reheating. In this way, the product 50 can also be distributed commercially, in commercial enterprises, such as for example, but not only, bars, restaurants, stalls, including mobile ones, stands and/or corners for the distribution of food products, hotels and suchlike, in supermarkets and similar sales points equipped for the cold chain, or also automatic food product dispensers. The product 50, as we said, can be prepared and cooked already filled, or can be filled afterward for the final user.

FIGS. 1-5 show one embodiment of the device according to the present invention, indicated by the reference number 10, which comprises a single mold 12 as described above.

FIGS. 9-16 instead show another embodiment of the device according to the present invention which is made as a multi-mold device and comprises a plurality of molds 12, disposed aligned in a desired direction and having the characteristics described above. The molds 12, with the corresponding cavities 14, are made integrated in a single tray 36, advantageously made on a single upper surface 43. This solution is advantageous because it allows to cook, for example to put simultaneously into the oven, several molds 12, prepared with the dough and possible filling. In this solution, it is possible to use a single molding member 16 to shape and possibly eliminate the excess parts of dough, operating in series for each mold 12. Otherwise, it is possible to equip each mold 12 with its own molding member 16.

FIGS. 13-16 in particular show a variant of the tray 36, in which a support frame 38 is provided, inclined or horizontal and able to position the tray 36.

The support frame 38 is configured so that, disposing several trays 36 adjacent, it is possible to partly superimpose the trays 36 and optimize or maximize the use of the available space, for example in the oven.

In particular, the support frame 38 is hollow inside and has a front blade 40, also inclined or horizontal, which functions as a grip and a support for the positioned sticks 22, which develops for the whole length affected by the molds 12. Thanks to the "propeller" conformation of the sticks 22, which are thus retained in the seatings 20, they are prevented from sliding downward along the front blade 40.

In the variant solution shown in FIG. 16, the support frame 38 comprises two lateral walls 42, trapezoid in shape, even if a triangular shape or other may be provided, with the corresponding sides inclined or horizontal which define the inclination, or lack of it, of the support frame 38, and hence of the tray 36. The lateral walls 42 are connected by one or more transverse elements 44, of which one front transverse element 44 is associated with the front blade 40.

The tray 36 is disposed between the lateral walls 42, with the upper surface 43 defining an inclined or horizontal plane parallel to which the molds 12 lie.

The reciprocal and sequential disposition of several trays 36 during cooking causes the rear part of the support frame 38 of the previous tray 36 introduced to be positioned above the front blade 40 of the tray introduced later. This reduces the space occupied by the trays 36, without having a negative effect on the exposure of the dough to the heat, for example the radiant heat in the oven, and hence on the cooking. In fact, the part that is covered by the partial overlapping of the successive trays 36 is the part relating to the sticks 22 and not the dough. Furthermore, the possible inclination of the various support frames 38 can further reduce the overall space occupied by the trays 36 during cooking.

In a variant, it may be possible to make the molds 12 separate, for example by pressure die-casting, and then join them together, for example with one or more welded bars and to provide supporting elements or feet.

FIGS. 18, 19 and 20 show variants of the device 10 according to the present invention.

According to a variant, the mold 12 and the molding member 16 are hinged to each other by means of a hinging member 60 which provides respective male eyelet elements 62 and female eyelet elements 64, coupled with each other. The hinging allows to rotate or pivot the molding member 16 horizontally with respect to the mold 12, to pass from the position distanced from the mold 12 to the position coupled with the mold 12 and viceversa. In this case, the hinging is obtained along a hinging axis transverse to the main longitudinal axis of development of the mold 12. In other variants, the pivoting axis could be parallel to the main longitudinal axis of development of the mold 12. FIG. 18 shows a pin 61 that cooperates with the hinging member 60, inserted in the male 62 and female 64 eyelet.

FIG. 21 shows a single pin or bar 72 that cooperates with a plurality of the aligned hinging members 60 of a plurality of molds 12 disposed adjacent in a row. The single pin or bar 72 is inserted simultaneously in all the hinging members 60, acting as a single hinging element for all the molds 12 to allow the simultaneous rotation of all the molding members 16 with respect to the molds 12 below.

According to another embodiment, not shown in the drawings, between adjacent hinging members 60, that is, between adjacent molds 12 and molding members 16, spacer elements are provided, which define the reciprocal distance between adjacent molds 12 and respectively molding members 16. In some embodiments the spacer elements are inserted in the single pin or bar 72.

According to another variant shown in FIGS. 18-21, the molding member 16 may not be open as in FIGS. 1, 6, 7 and 8, but can be closed, that is, configured as a solid cover.

In this variant, the molding member 16 can be kept coupled to the mold 12 during cooking as well.

In this variant, the molding member 16 configured as a solid cover may be formed by a central plate 51, from which the peripheral frame 28 protrudes, defining an expansion seating 66 for the product 50.

The expansion seating 66 has a plan shape and size that can be mating with the plan shape and size of the product 50. This solution can control the volumetric expansion of the product 50 during cooking. In fact, the product 50 can swell during cooking and, thanks to the fact that the molding member 16, in its position coupled with the mold 12, completely closes the mold 12, the expansion of the dough of the product 50 is limited. In this way, by accurately sizing the mold 12 and the central plate 51, it is possible to define a desired volume of the expansion seating 66 such that the height or thickness of the product 50 is suitably limited. It is therefore possible to accurately standardize the sizes, for example the thickness, of the finished product 50, which facilitates the industrialization of the manufacturing method, and also gives obvious advantages in packaging, transport and storage.

According to another variant, shown in FIG. 21, it is possible to obtain a multi-mold device, that is, with a plurality of molds 12, but simplified with respect to that shown in FIGS. 9-16. In fact, with reference to the variants in FIGS. 18-20, it is possible to provide lifting eyelets 68, 70 respectively on the molding member 16 and on the mold 12, which cooperate with two single gripping bars 74, 76. One bar 74 is inserted in the aligned lifting eyelets 68 of the molding members 16, shown overlapping in a closed position coupled with the respective molds 12, while one bar 76 is inserted in the aligned lifting eyelets 70 of the molds 12 shown below. By means of one or both the bars 74, 76 it is possible to simultaneously open and close all the molding members 16 with respect to the molds 12, rotating them as indicated by the arrow F in FIG. 21, around the single pin or bar 72 coupled with the respective hinging members 60.

In some embodiments, not shown in the drawings, it may be provided that spacer elements are provided in the bars 74, 72 and between the lifting eyelets 68, 70 in order to define the reciprocal distance between one mold 12 or respectively a molding member 16, and the adjacent one.

It is clear that modifications and/or additions of parts may be made to the device 10 to mold and cook a food product, the corresponding method and the food product thus obtained as described heretofore, without departing from the field and scope of the present invention.

In some variant embodiments, during preparation, before cooking, the dough may be distributed in the mold 12, instead of laid.

In other variant embodiments, the filling can be inserted in the closed shell or casing 52 of the product 50 also after cooking, for example by injection, syringing or other technique, or it may be prepared empty and subsequently filled, also expressly on each occasion for the consumer. In this variant, the product 50 swells after cooking and defines a cavity inside the closed shell or casing 52 into which the filling can be injected.

In variant embodiments, the filling can also be sweet, heterogeneous, or homogeneous, such as for example a sweet cream or similar product.

In other variant embodiments, the stick 22 can be inserted into the closed shell or casing 52 of the product 50 also after cooking. In such variants, the device 10 may not have the seating 20 for positioning the stick 22 during cooking.

In other variant embodiments, the peripheral frame 28 of the molding member 16, which in any case affects the whole periphery, can be the discontinuous type, that is, it may have intervals or discontinuities, such as notches or suchlike, so as to obtain a line of weakening or pre-cutting, without necessarily obtaining a clean cut.

In variant embodiments, the rib 24 of the mold 12 may also not have a shape mating with the external perimeter edge 18.

Again in other variants, it is possible to provide that the molding member 16 in practice performs only the welding of the dough of the product 50 and that an external molding member is used to complete and trim the product 50 in the excess parts.

An auxiliary heated member may also be provided, used after cooking and functioning as a heated press, for example at high temperature, even 250° C., which re-heats the soft crust of the cooked dough obtaining a biscuit effect. In this variant it may be provided to insert the stick 22 after cooking and to make the soft crust solid around the stick 22 by means of said heated auxiliary member which achieves a new, hot welding.

It is also clear that, although the present invention has been described with reference to some specific examples, a person of skill in the art shall certainly be able to achieve many other equivalent forms of device for molding and cooking a food product, the corresponding method and the food product thus obtained, having the characteristics as set forth in the claims and hence all coming within the field of protection defined thereby.

The invention claimed is:

1. A device to mold and cook a food product, comprising:
   molds integrated in a single tray; and
   an inclined or horizontal support frame which positions the tray, wherein the support frame is hollow inside and has an inclined or horizontal front blade for positioning a stick associated with each of the molds, said blade being able to be inserted at least partly inside a support frame of an adjacent tray,
   wherein each of the molds comprises:
   a cavity in which to place at least the uncooked dough, the cavity being delimited externally by an external perimeter edge,
   a rib mating with the external perimeter edge and defining a seating which partly surrounds the cavity, and
   a molding member coupled to the rib, said molding member shaped with a closed profile, said molding member comprises:
   a shape and a size mating with the external perimeter edge,
   a position distanced from one of the molds and a position coupled with the one of the molds in order to cooperate with portions and strips of dough which exceed the size of the one of the molds, so as to shape and mold the food product, in which, internally and distanced by a desired length with respect to the external perimeter edge, and
   a peripheral frame which develops in a closed profile, so as to affect the whole external perimeter edge, and a ridge which protrudes from said peripheral frame, with a shape mating with that of the seating of the one of the molds.

2. The device as in claim 1, wherein the external perimeter edge is an open profile and has a seating to position a support stick transverse to the external perimeter edge so as to be partly incorporated in the product.

3. The device as in claim 2, wherein the development of the peripheral frame affects the whole external perimeter edge including the segment in which the seating is made.

4. The device as in claim 1, wherein said molding member is open and is formed by said peripheral frame.

5. The device as in claim 1, wherein said molding member is closed, configured as a cover formed by a central plate which has said peripheral frame on its perimeter.

6. The device as in claim 5, wherein the central plate and said peripheral frame define an expansion seating.

7. The device as in claim 1, wherein the molding member and the one of the molds are reciprocally sized so as to be coupled tangentially flush with each other, or also slightly inclined, thus determining the action of cutting the dough that exceeds the one of the molds.

8. The device as in claim 1, wherein the ridge is sized with a height slightly less than the depth of the seating, so that, when the molding member is coupled with the one of the molds, the lower face of the ridge remains slightly distanced from the bottom of the seating, defining a free space.

9. The device as in claim 1, wherein the one of the molds is hinged to the molding member.

10. The device as in claim 9, wherein said molds are all hinged to the respective molding members by means of a single pin or bar.

11. The device as in claim 1, wherein the support frame comprises two lateral walls with inclined or horizontal sides which define an inclined or horizontal plane parallel to which the molds lie, said lateral walls being connected by one or more transverse elements associated with the front blade.

12. The device as in claim 1, wherein the one of the molds has through holes.

* * * * *